(12) United States Patent
Robinson et al.

(10) Patent No.: US 10,569,265 B2
(45) Date of Patent: Feb. 25, 2020

(54) EFFICIENT IN-SITU CATALYST SULFIDING METHODS AND SYSTEMS

(71) Applicant: Reactor Resources, LLC, Alvin, TX (US)

(72) Inventors: James Maxie Robinson, Friendswood, TX (US); James Michael Robinson, Alvin, TX (US)

(*) Notice: Subject to any disclaimer, the term of this patent is extended or adjusted under 35 U.S.C. 154(b) by 0 days.

(21) Appl. No.: 16/140,950

(22) Filed: Sep. 25, 2018

(65) Prior Publication Data

US 2019/0091678 A1 Mar. 28, 2019

Related U.S. Application Data

(63) Continuation of application No. 15/047,727, filed on Feb. 19, 2016, now Pat. No. 10,081,011, which is a continuation of application No. 14/212,319, filed on Mar. 14, 2014, now Pat. No. 9,272,254.

(60) Provisional application No. 61/852,396, filed on Mar. 15, 2013.

(51) Int. Cl.
*B01J 37/20* (2006.01)
*B01J 33/00* (2006.01)
*B01J 8/00* (2006.01)

(52) U.S. Cl.
CPC .............. *B01J 37/20* (2013.01); *B01J 8/001* (2013.01); *B01J 33/00* (2013.01); *H05K 999/99* (2013.01); *B01J 2208/0007* (2013.01); *B01J 2208/00044* (2013.01); *B01J 2208/00061* (2013.01); *B01J 2208/00088* (2013.01); *B01J 2208/00539* (2013.01); *B01J 2208/00548* (2013.01); *B01J 2208/00592* (2013.01); *B01J 2208/00628* (2013.01)

(58) Field of Classification Search
CPC ..... B01J 8/00; B01J 8/001; B01J 33/00; B01J 37/00; B01J 37/20; B01J 2208/00–00044; B01J 2208/00061; B01J 2208/0007; B01J 2208/00088; B01J 2208/00539; B01J 2208/00548; B01J 2208/00592; B01J 2208/00628
See application file for complete search history.

(56) References Cited

U.S. PATENT DOCUMENTS 6,503,864 B2 * 1/2003 Loescher ................. B01J 37/20
502/168
9,272,254 B2 * 3/2016 Robinson ................. B01J 8/001

FOREIGN PATENT DOCUMENTS

WO    WO-2010072836 A1 * 7/2010 ............ B01J 23/755

* cited by examiner

*Primary Examiner* — Natasha E Young
(74) *Attorney, Agent, or Firm* — McAughan Deaver PLLC

(57) ABSTRACT

A system and method is disclosed for efficiently sulfiding metal catalyst resident in a reactor vessel comprises a sulfiding module and a hydrogen sulfide detection module and a remote computer all arranged and configured to communicate wirelessly and to allow remote control and monitoring of the modules and sulfiding process.

20 Claims, 8 Drawing Sheets

EFFICIENT IN-SITU CATALYST SULFIDING METHODS AND SYSTEMS

CROSS REFERENCE TO RELATED APPLICATIONS

This application is a continuation of U.S. application Ser. No. 15/047,727, now U.S. Pat. No. 10,1081,011, filed Feb. 19, 2016, which is a continuation of U.S. application Ser. No. 14/212,319, now U.S. Pat. No. 9,272,254, filed Mar. 14, 2014, which claims benefit of and priority to U.S. Provisional Application Ser. No. 61/852,396, filed on Mar. 15, 2013, the entire contents of each of which are incorporated herein for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to methods and apparatuses for sulfiding a hydrocarbon processing catalyst; and more specifically to methods and apparatuses for sulfiding a hydrocarbon processing catalyst resident in a reactor.

Description of the Related Art

Hydroprocessing units, such as hydrotreaters, hydrodesulfurizers and hydrocrackers, found in hydrocarbon refineries utilize metal catalysts to aid the chemical reactions. These catalysts require periodic sulfiding to reach maximum catalytic activity. For purposes of this disclosure, "sulfiding" means causing the reaction of a catalyst metal with hydrogen sulfide.

There are several ways to sulfide catalyst already packed in a reactor vessel, commonly referred to as in-situ sulfiding, such as by using the naturally occurring sulfur in the hydrocarbon feed stock (aka sour feed). While avoiding the cost of an independent source of sulfur, using feedstock sulfur can be time consuming and potentially harmful if the sulfur content is not carefully monitored or high enough. An alternative to using feedstock sulfur is to use an independent sulfur source such as mercaptans, sulphides, disulphides, polysulphides and sulfoxides, such as Dimethyl Disulfide (DMDS), Dimethyl Sulfide (DMS), Dimethyl Sulfoxide (DMSO), di-tertiary-butyl polysulfide (TBPS), tertiary nonylpolysulfide (TNPS) and refinery acid gas. These sulfur sources can be used to perform in-situ liquid phase sulfiding or in-situ gas phase sulfiding.

In general, within the hydroprocessing unit, sulfur is reacted with hydrogen to form hydrogen sulfide ($H_2S$). The metal oxide catalysts are reacted with hydrogen sulfide ($H_2S$) and hydrogen ($H_2$) at elevated temperatures to form the active metal sulfide, such as $MoS_2$, $CO_9S_8$, $WS_2$ or $Ni_3S_2$, in an exothermic reaction. Theoretically, only the stoichiometric amount of sulfur is needed to activate the catalyst. However, in the real world of commercial refineries, it is common to use more than the stoichiometric amount of sulfur to ensure complete sulfiding. Excess sulfur creates excess hydrogen sulfide and other sulfiding products that must be disposed of or otherwise dealt with.

Liquid DMDS is often used as the sulfur source because of its high sulfur density by weight (compared to the other potential sulfur sources) and lack of solid or overly reactive decomposition products, which absence reduces coking. DMDS can be injected into the hydrocarbon feed stream as a liquid or into the hydrogen recycle loop as a gas. Under temperature and pressure, DMDS will decompose into $H_2S$ at several temperature ranges including about 350° F. to about 450° F.; about 390° F. to about 500° F. and about 450° F. to about 520° F.

The inventions disclosed and taught herein are directed to methods and apparatuses for efficiently sulfiding catalysts packed in a reactor vessel.

BRIEF SUMMARY OF THE INVENTION

As a brief summary of one of many possible embodiments of our inventions, a system for sulfiding a metal catalyst comprises a mobile sulfur supply module comprising a sulfur product inlet and outlet, a sulfur product measurement device, a sulfur product pressurization device having a variably controllable output, a controller in electrical communication with at least the measurement device and pressurization device, and a first communication device configured to transmit information between the module and an external site; a mobile detection module comprising an inlet and outlet, a hydrogen sulfide concentration detection device located between the inlet and outlet, a hydrogen gas concentration detection device located between the inlet and the outlet, and a second communication device configured to transmit information between the hydrogen sulfide detection device and the external site and between the hydrogen gas detection device and the external site.

As brief summary of another of many possible embodiments of our inventions, a system for liquid phase in-situ sulfiding of a metal catalyst, comprises a sulfur supply module comprising a fluid measurement device comprising a Coriolis meter, a fluid pump having a variably controllable output comprising an A/C motor and a variable frequency drive, a controller in electrical communication with at least the measurement device and variable frequency drive, and a first wireless communication device configured to transmit information to and from the module; a mobile detection module comprising a hydrogen sulfide concentration detection device located between a detection module inlet and outlet, a hydrogen gas concentration detection device located between the inlet and the outlet, and a second communication device configured to transmit information to and from the hydrogen sulfide detection device and to and from the hydrogen gas detection device.

As yet another brief summary of another possible embodiment of our inventions, any of the previously summarized systems may further comprise an Internet website configured to receive information transmitted by the sulfur supply module, the hydrogen sulfide detection module and the hydrogen gas detection module, and to display the information received in substantially real time.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
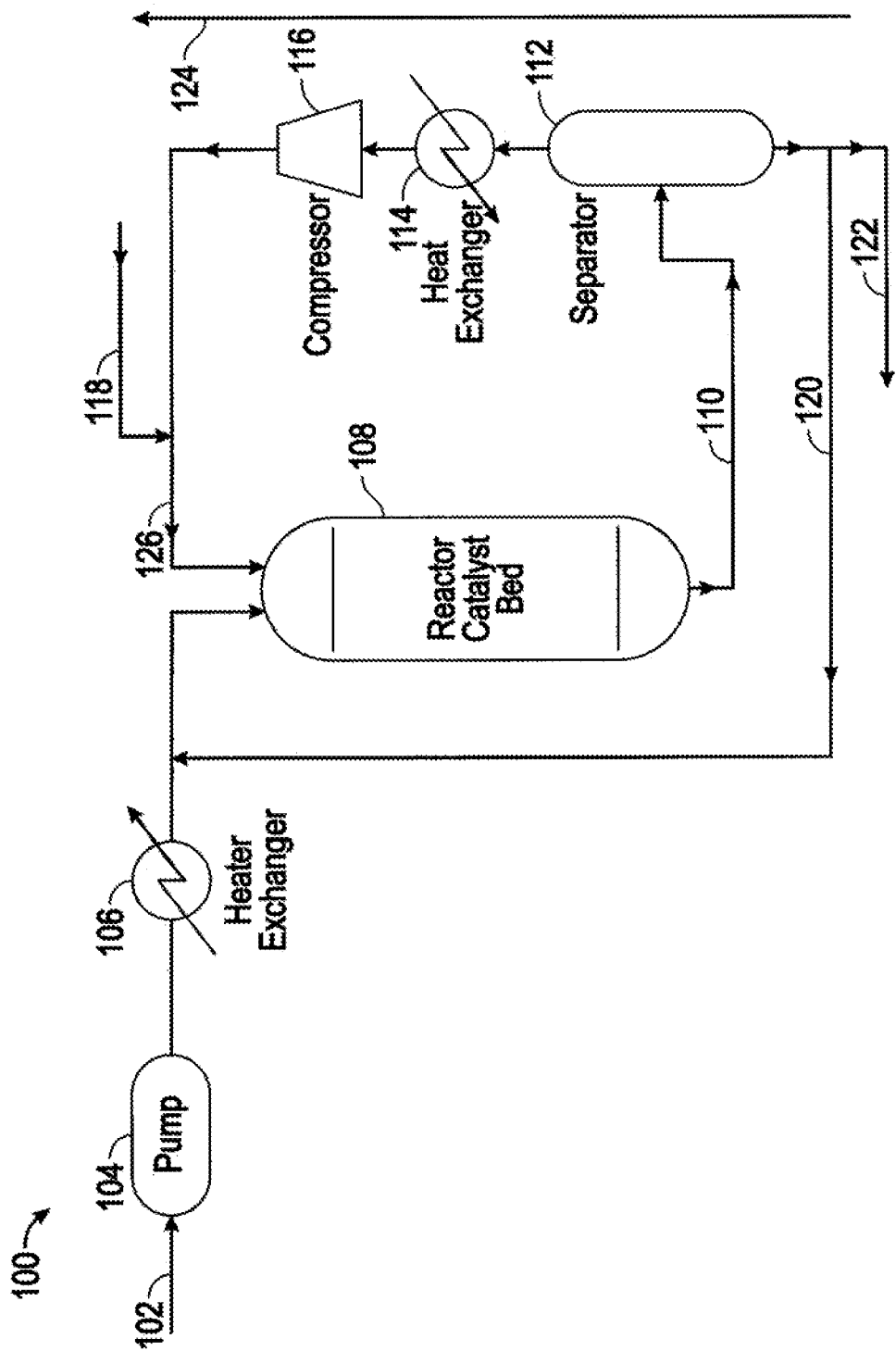
FIG. 1 illustrates an exemplary hydroprocessing unit to which the present inventions may be implemented.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

In general terms, we have invented systems and processes for efficiently and controllable sulfiding catalyst resident in a reactor vessel through measurement, control, and continuous real time reporting of reactants and operational parameters. Our systems and methods may comprise a front-end sulfur supply system and a back-end detection system. A sulfur supply system may be configured to provide a sulfur source, such as, but not limited to, liquid dimethyl disulfide (DMDS) using a controlled and controllable pump, a fluid property measurement device, such as a Coriolis flow measurement instrument, and a data transmission component. A hydrogen sulfide detection system may comprise a real-time or quasi-real-time $H_2S$ detection component and a data transmission component. A hydrogen gas detection component may comprise a real-time or quasi-real-time $H_2$ detection device and a transmission component, which may be the same transmission component as the used by the hydrogen sulfide detection system. A water detection component may comprise a real-time or quasi-real-time water detection device and a transmission component.

In a preferred, but non-limiting embodiment, a sulfur supply system, a hydrogen sulfide detection system, a hydrogen gas detection system and a water detection system transmit data wirelessly to one or more computers for data display and/or system control, and/or the Internet for distribution to others for display and/or system control. By collecting and processing data from the sulfur supply system, the hydrogen sulfide detection system, the hydrogen gas detection system and/or the water detection system, the apparatuses and methods of our inventions efficiently and effectively control and/or reduce the amount of sulfur consumed in the sulfiding process; efficiently and effectively reduce the amount of unwanted or unneeded $H_2S$ generated; and efficiently and effectively reduce the amount of sulfur oxides that are introduced into the atmosphere by flaring unwanted $H_2S$, and other sulfiding byproducts.

Turning now to the figures, FIG. 1 illustrates in general fashion a hydroprocessing system 100, comprising a process inlet through which hydrocarbon feedstock 102 may enter the system 100. A pump or other pressurizing device 104 may be used to introduce the feedstock 102 into the system 100. A heat exchanger 106, such as a furnace, may be used as needed to heat the feedstock 102 to the appropriate temperature range for the chemical processes involved in system 100. Heated feedstock 102 may be introduced to a reactor vessel 108 for primary chemical processing. Reactor vessel 108 typically contains a metal catalyst or a plurality of catalysts designed to increase the efficiency of the chemical reaction therein. Reactor products 110 may be fed to a separator 112 where the reactor products 110 are separated into, for example, their liquid and gas phases. The gas phase may be passed through another heat exchanger 114 to extract heat and thereby cool the gas so that it may be compressed 116 and returned to the reactor vessel 108. A hydrogen gas makeup line 118 may be used to add hydrogen ($H_2$) gas to the process as needed. Liquid components of the reactor products can be recirculated through line 120 to the input to reactor vessel 108. The ultimate or final product 122 of the system 100 may be extracted from the system 100 as shown. Waste or undesired products also can be extracted. Also illustrated in FIG. 1 is a low pressure flare line 124 for combusting reaction products, waste products and other materials, as needed and allowed.

It will be appreciated that FIG. 1 illustrates at a very high level the basic components of a catalyst-based hydroprocessing system 100. FIG. 1 is not intended to be a complete or actual hydroprocessing system. It will also be appreciated that catalyst-based hydrocarbon processing systems such as illustrated in FIG. 1 typically require that the metal catalyst periodically be re-charged or regenerated to maintain peak reaction efficiency.

Figure 2:
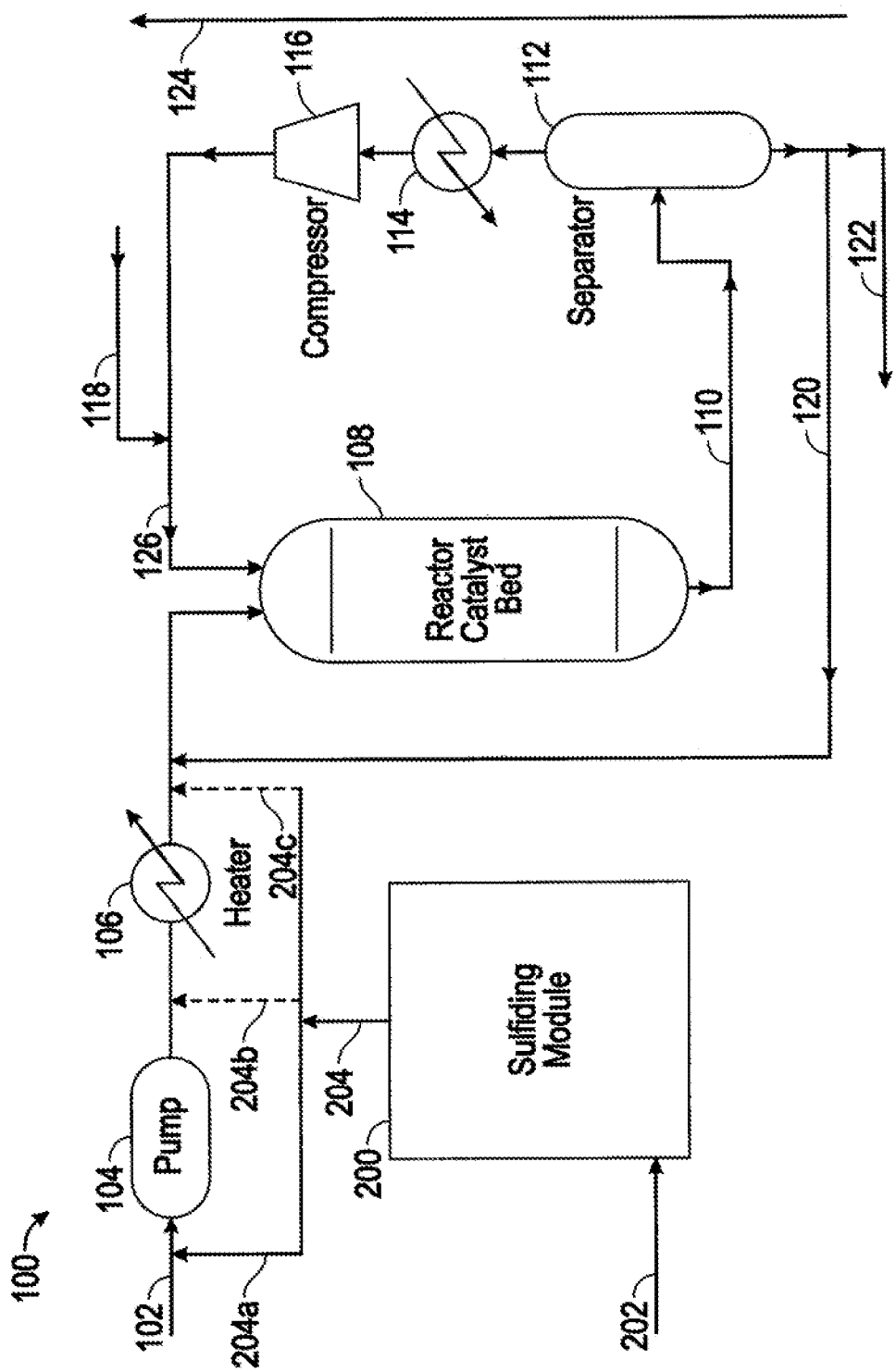
FIG. 2 illustrates the hydroprocessing unit of FIG. 1 with a sulfiding module according to the present invention.

FIG. 2 illustrates a refinery process 100 during a shutdown for sulfiding or re-sulfiding of the metal catalyst in reactor 108. Illustrated in FIG. 2 is a sulfiding module 200 comprising a sulfur product 202 inlet and a sulfur product outlet 204. As illustrated in FIG. 2, for liquid phase in-situ sulfiding the output 204 of sulfiding module 200 may be injected into process 100 at a location 204a upstream of pressurizing device 104, or at a location 204b downstream of pressurizing device 104 or at a location 204c downstream of heat exchanger 106. It will also be appreciated that for gas phase in-situ sulfiding output 204 may be injected into the gas recycle line 126.

It is contemplated, although not required, that sulfiding module 200 be a mobile unit, such as a trailer or sled, that can be transported to a refinery or to a location within a refinery adjacent a reactor vessel 108 in need of catalyst sulfiding. As discussed previously, the sulfur source 202 may be any of a number of conventional sulfur-bearing products such as, but not limited to, liquid DMDS, and such sulfur product 202 may be drawn from containers, such as tanker trucks (not shown) and the like.

Figure 3:
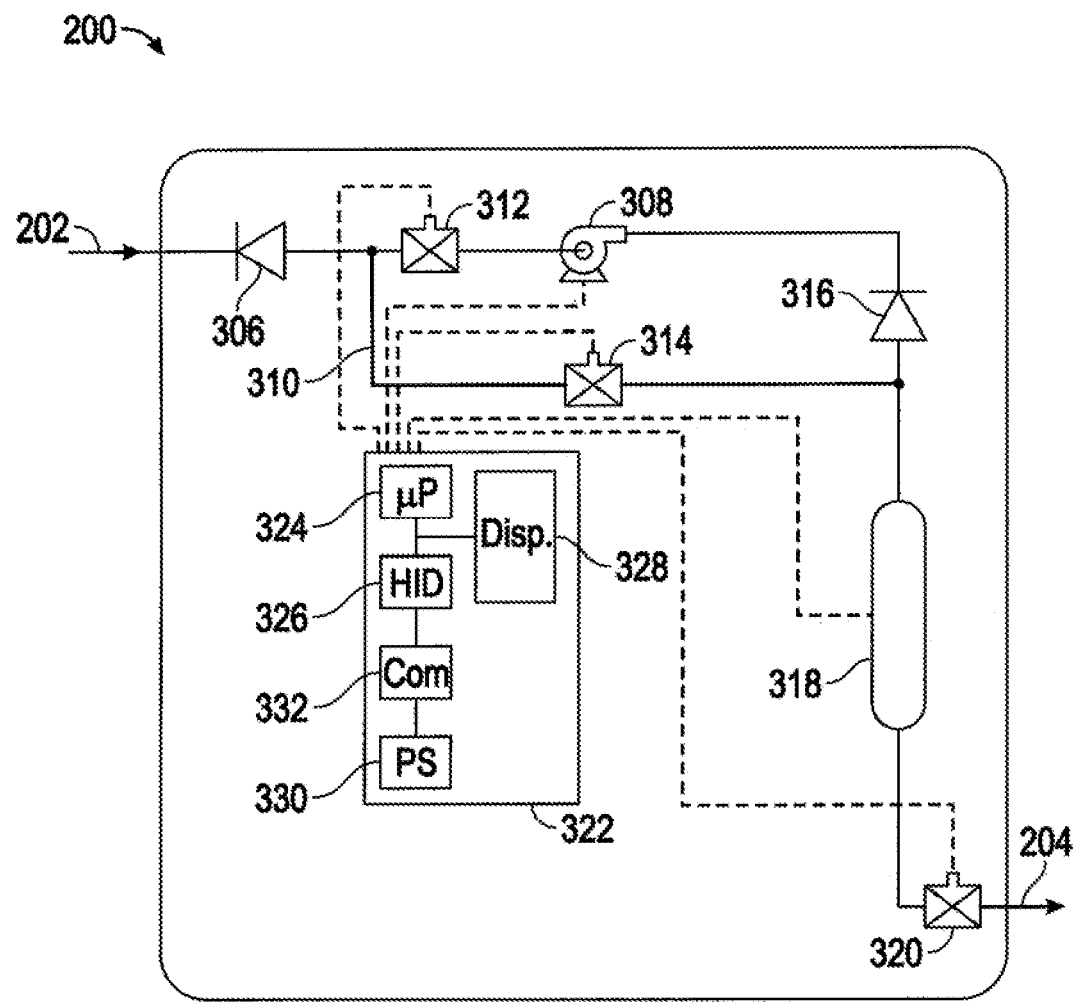
FIG. 3 illustrates one of many possible sulfiding modules according to the present inventions.

Turning now to FIG. 3, which illustrates one of many possible embodiments of a liquid phase in-situ sulfiding module 200 implemented on a mobile platform. The sulfiding module 200 may comprise a sulfur inlet 202 and a one-way flow device or check valve 306 configured to prevent sulfur product 202 from backing out of the sulfiding module 200. Downstream of the check valve 306 is a pump 308 configured to pressurize the liquid sulfur product 202 and inject it into the refinery process 100, such as illustrated in FIG. 2. Although liquid DMDS is used as the sulfur source 202 in this particular embodiment, it will be appreciated that gaseous forms of sulfur may be used, and in such cases pump 308 would be replaced with a compressor or other device capable of pressurizing a gas for injection into the process 100. It is presently preferred that the pump 308 be a semi-positive displacement type pump, such as a radial vane pump, and that the pump 308 be controllable, such as by a variable frequency drive and an A/C motor (not shown). For example, a low-pressure sulfiding module 200 may comprise a pump 308 configured to deliver between about 40 gallons/minute and about 60 gallons/minute of sulfur product 202 at about 200 psig to about 250 psig. Alternately, a high-pressure sulfiding module 200 may comprise a pump 308, such as a high pressure positive displacement triplex pump, configured to deliver between about 14 gallons/minute and about 20 gallons/minute of sulfur product 202 at a pressure up to about 3,000 psig. Those of skill having benefit of this disclosure will appreciate that a single sulfiding module 200 may comprise dual pressure systems. It will be appreciated that a sulfiding module 200 may be designed with other types of pumps or fluid pressurizing devices, including positive displacement pumps, centrifugal pumps, compressors and other types of fluid pressurizing devices.

Also illustrated in FIG. 3 is a pump bypass conduit 310 for those situations where the suction side of the process pump 104 may be used to draw sulfur product 202 into the system 100. Controllable valves 312 and 314 are shown and may be configured to allow the sulfur product 202 to pass through pump 308 or to bypass pump 308, as required for the specific process 100 at issue. Also shown in FIG. 3 is an additional one-way flow device or check valve 316 configured and located to prevent sulfur product 202 from backflowing into pump 308.

Once the sulfur-bearing liquid product 202 has passed through pump 308 or bypassed pump 308, the sulfur product 202 passes through a fluid measurement device 318 preferably capable of measuring a variety of properties of liquids and/or gases. At a minimum, it is preferred that the measurement device 318 be capable of measuring the volumetric flow rate of sulfur product 202. It is preferred, however, that the measurement device 318 be capable of and configured to measure and report not only volumetric flow rate but also mass flow rate, density, temperature, and other fluid properties. It is preferred that the measurement device 318 also be capable of indicating a loss of sulfur product or "dry pipe" condition to avoid pump 308 cavitation. For example and without limitation, it is presently preferred that the measurement device 318 be an Endress+Hauser ProMass 83E Coriolis mass flow measuring instrument. After passing through measurement device 318, the sulfur product 202 may pass through a final controllable valve 220 and exits the sulfiding module 200 through outlet 204.

FIG. 3 also illustrates that sulfiding module 200 may, and preferably does, comprise a controller 322 configured to receive inputs from and to provide outputs, such as control signals, to, at least, one or more of controllable valves 312, 314 and 320, pump 308 and measurement device 318. Controller 322 may comprise a microprocessor, programmable gate array, PID controller or other programmable logic device 324, a human input device 326, such as a keyboard or touchscreen, a visual display device 328, such as a liquid crystal display or other device capable of presenting visual information, memory, a power supply 330 for powering the controller 322 components and/or a communications component 332.

Communications component 332 may comprise a wired or wireless communications interface. These various components of controller 322 are all configured and arranged in known fashion to provide data gathering, reporting and/or control of at least the various components on the sulfiding sled 200. It is preferred that the communications module 332 be a wireless interface or a wireless cellular interface, allowing monitoring and/or control of the sulfiding module 200 from one or more locations remote to the module 200. For example, and without limitation, the communications module 332 may allow the process 100 owner to monitor in substantially real time the pre-sulfiding process as reported by controller 332. Further, wireless and wired connection allows remote control of the sulfiding system from a computer or smartphone, such as, but not limited to, in the event of plant shut down or evacuation.

Figure 4:
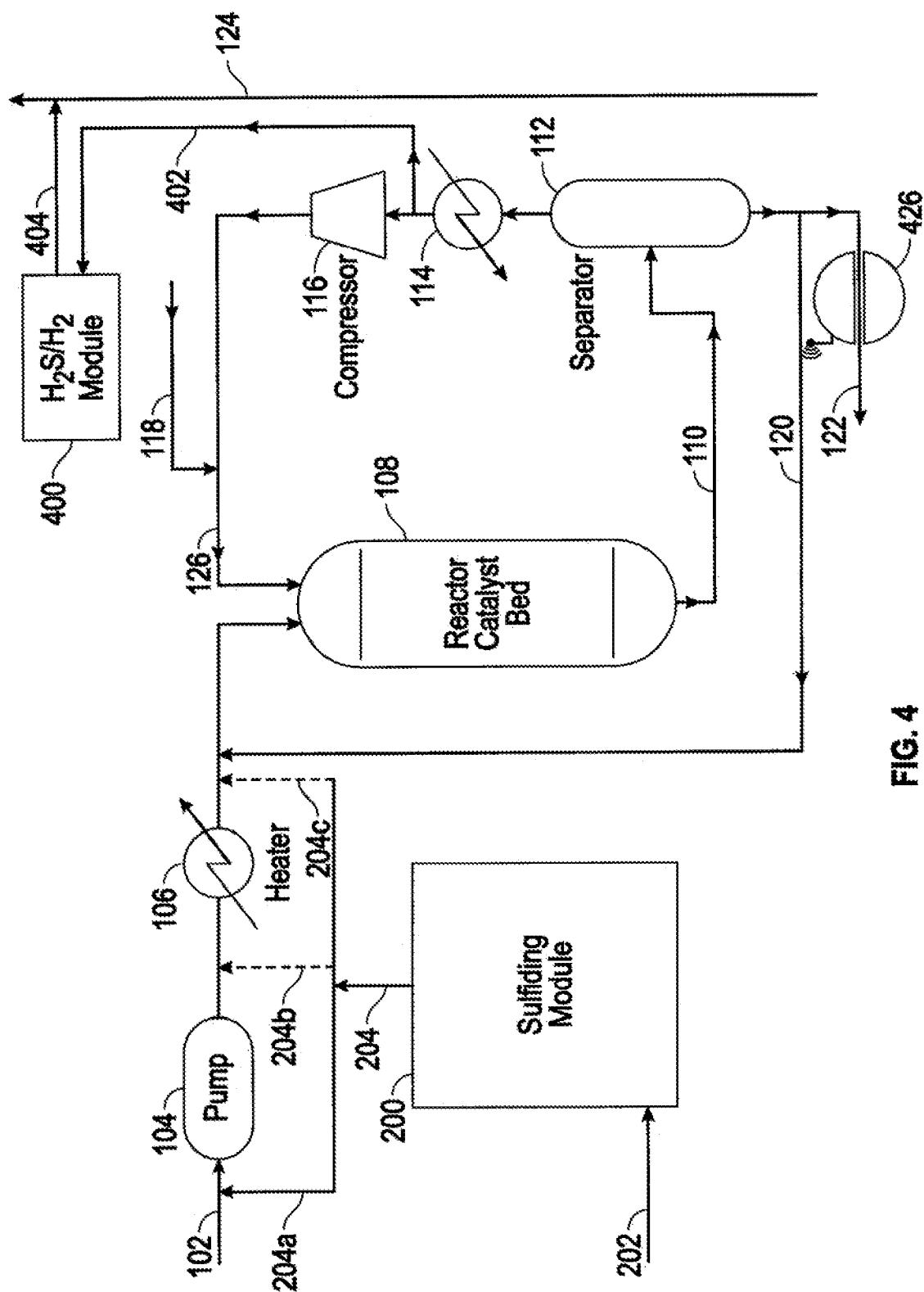
FIG. 4 illustrates the hydroprocessing unit of FIG. 1 with a sulfiding module and a detection module according to the present invention.

FIG. 4 illustrates the sulfiding system 200 shown in FIG. 2 with the addition of a combined hydrogen sulfide/hydrogen gas module 400. As is well known, during the sulfiding process, $H_2S$ and $H_2O$ are byproducts of the decomposition of the sulfur product 202, e.g., DMDS. It is known to measure the amounts of hydrogen sulfide generated during the sulfiding process to understand how the sulfiding process is progressing. Typically, $H_2S$ levels during sulfiding are measured using Draeger-Tubes® with self-contained breathing apparatuses and hand-held pumps designed to draw a fixed amount of gas into the tube on each pump stroke. It is also known that the sulfiding reaction requires the presence of hydrogen ($H_2$) gas and that decomposition of sulfur product 202 creates gasses, such as, but not limited to, methane that dilute the concentration of hydrogen gas in the reactor vessel 108.

As illustrated in FIG. 4, module 400 has an input 402, which preferably comprises a conduit plumbed between the process 100 and the module 400. The module 400 is configured to periodically, including substantially continuously, sample a portion of the sulfiding gas returning to reactor vessel 108 downstream of cooling heat exchanger 114, and preferably upstream of the compressor 116. It will be appreciated that depending on the configuration of the module 400 and the system 100, the gas sample may be obtained immediately downstream of separator 112, or downstream of compressor 116. As will be described in more detail below, the gaseous sample 402 is provided to module 400 for analysis, such as, for example, quantitative measurement, and reporting, such as to sulfiding module 200, and particularly controller 322, or to an external site such as a remote computer or the Internet. Once the gas sample has been tested, it may be sent to flare line 124 via outlet 404 or sent to other systems capable of disposing of or scrubbing the gas, such as venting to atmosphere, if appropriate.

Figure 5:
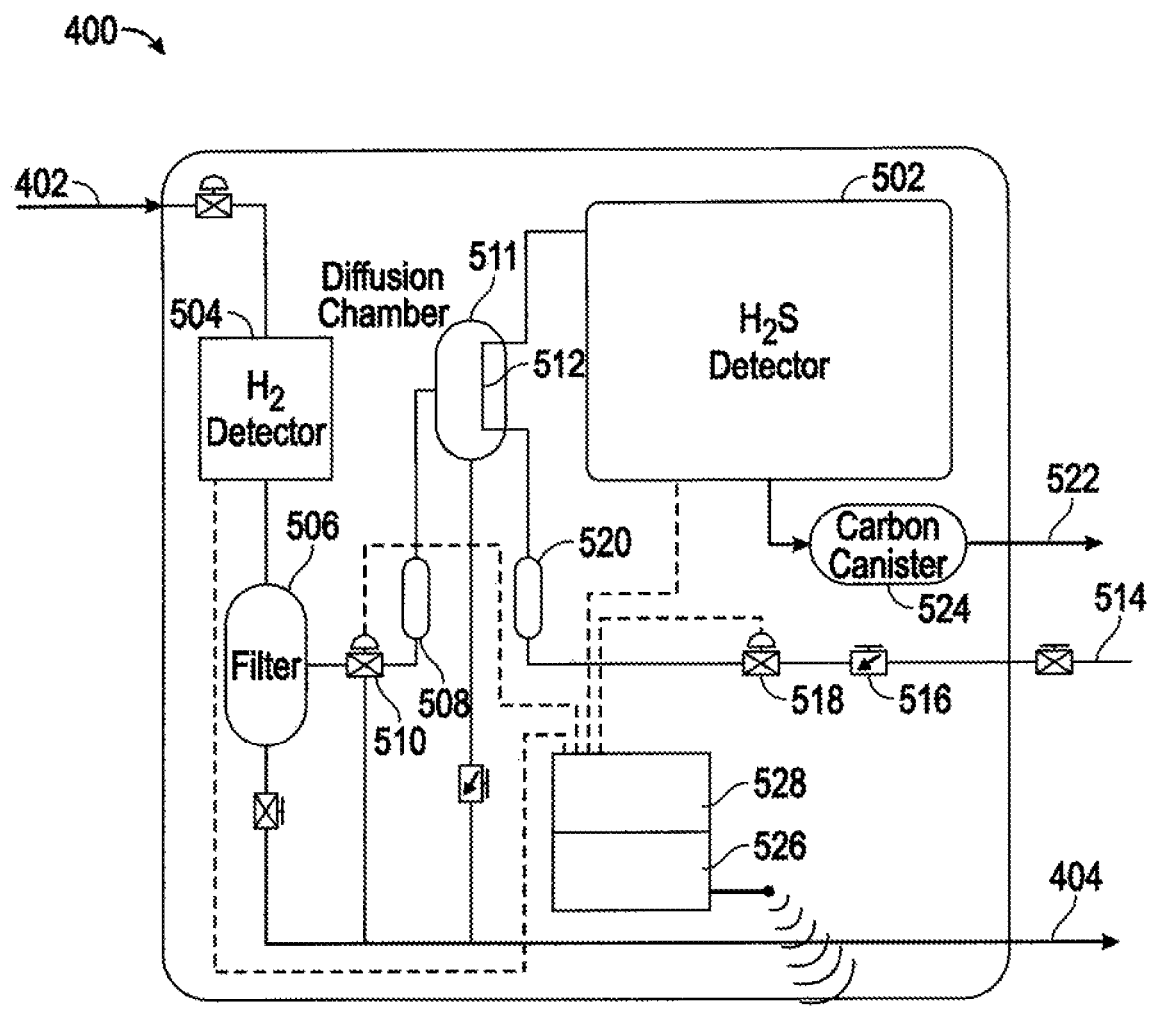
FIG. 5 illustrates one of many possible detection modules according to the present inventions.

As shown in FIG. 5, module 400 may comprise a hydrogen sulfide ($H_2S$) detection or analyzer system 502, such as, but not limited to, a lead acetate detection system, such as those available from Galvanic Applied Sciences, Inc. As is known, exposure of lead acetate tape to hydrogen sulfide results in a darkening of the white tape because of the formation thereon of lead sulfide. Module 400 may use a lead acetate detector system, or alternately, an electrochemical detector, such as the Model 5100 $H_2S$ Detector by Sierra Monitor, or other $H_2S$ detection system. Preferably, the $H_2S$ detection system used is capable of real-time or quasi-real-time detection and electronic reporting. If a lead acetate detection system 502 is used for module 400, it is preferred that an optical scanner or other device for converting information on the lead acetate tape into an electrical output, such as digital information, be used. Regardless of the detection system used, it may be desirable or necessary to provide a plurality of detection ranges, such as 0-500 ppm, 0-20,000 ppm and 0-30,000 ppm.

Module 400 may also comprise, and preferably does comprise, a hydrogen ($H_2$) gas detector 504, such as, but limited to, the HY-OPTIMA 2740 Explosion Proof In-Line Process Hydrogen Monitor available from $H_2$Scan Corporation. The type of hydrogen gas detector that can be used is not intended to be limited and includes detectors that are based on surface plasmon resonance sensors, electrochemistry sensors, MEMS sensors, thin film sensors, thick film sensors, chemochronic sensors, diode based sensors or metallic sensors. If a $H_2$ detector 504 is used, it is preferred that it also be capable of real-time or quasi-real-time detection and electronic reporting.

As illustrated in FIG. 5, a quantity of recycle gas 402 enters module 400 and, if present, preferably passes through hydrogen detector 504, which determines the concentration of hydrogen gas in the sample 402. The sample 402 then may pass through a coalescing filter 506 to remove water and hydrocarbon liquids that may be entrained in sample 402. It will be appreciated that depending on the type of hydrogen detector 504 used, the coalescing filter may be placed upstream of the hydrogen detector 504. Liquids coalesced by the filter 506 may drop out to module outlet 404 for communication with flare line 124, for example. After passing through the filter 506, the gas sample 402 may preferably pass through a flow meter 508, such as, but not limited to, a variable area flow meter, including a rotameter. It is not typically necessary for the flow meter 508 to be capable of electronic reporting, but such functionality is not excluded. The flow meter 508 will typically have associated therewith an adjustable orifice, such as a needle valve, to finely adjust the flow rate of the gas sample 402 ultimately delivered to the $H_2S$ detector 502. Shown disposed between the filter 506 and the flow meter 508 is controllable valve 510, which preferably also has pressure relief capabilities. The valve 510 can be closed in which state the gas sample 402 will pass through outlet 404. Also, if the gas pressure exiting filter 506 is too high for $H_2S$ detector 502 (or $H_2$ detector, if so plumbed), the relief valve will open thereby venting the gas sample to the outlet 404.

Once gas sample 402 passes through flow meter 508, it passes into a diffusion chamber 511. Diffusion chamber 511 comprises a permeable membrane 512, such as permeable tubing. Nitrogen gas 514, typically supplied by the refinery, enters the module 400 as shown and may pass through a flow control valve or metering valve 516 and/or a controllable valve 518 before it reaches a flow meter 520, such as, but not limited to a variable area flow meter, including a rotameter. Similar to flow meter 508, it is not typically necessary for the flow meter 520 to be capable of electronic reporting, but such functionality is not excluded.

The flow meter 520 will typically have associated therewith an adjustable orifice, such as a needle valve, to finely adjust the flow rate of nitrogen gas 514 ultimately delivered to the diffusion chamber 511. For the lead acetate based detector 502 in this example, the gas sample 402 is diluted at a ratio of about 1 part gas sample to about 1000 parts nitrogen gas.

Inside the diffusion chamber 511, $H_2S$ gas diffuses into the nitrogen gas stream separated by the permeable membrane 512 and the combined H2S and $N_2$ gas stream is fed to the lead acetate $H_2S$ detector 502, as illustrated. The $H_2S$ detector 502 determines the concentration of $H_2S$ in the sample and generates an electronic signal representative of the $H_2S$ concentration. In this example, because $H_2S$ detector 502 is a lead acetate detector, the gas sample that exits detector 502 is free, or substantially free, of $H_2S$ and the gas sample may be vented to atmosphere 522 after, preferably, passing through a carbon filter 524. It will be appreciated that if other types of $H_2S$ detectors are used, such as, but not limited to, electrochemical detectors, the arrangement and plumbing within module 400 may change according to the operating parameters and requirements of the detector. And, the gas sample exiting the detector may need to be plumbed to the flare line 124 instead of vented to atmosphere.

Module 400 may also comprise, and preferably does comprise a communications module 526 that can communicate wirelessly or over wire to sulfiding module 200 or to a remote site, including a remote controller, computer or the Internet. In a preferred embodiment, module 200, and, for example, controller 322, is configured to receive a wireless data transmission from module 400 and, report, for example, the hydrogen sulfide concentration data and hydrogen gas concentration data through communications module 332. Alternately, or additionally, module 200 and specifically controller 322, can use the data obtained from the module 400 to control the sulfiding process. For example and without limitation, as the hydrogen sulfide concentration increases in the gas sample from the sulfiding process, controller 322 can slow down sulfur pump 308 or otherwise adjust the amount of sulfur product been supplied to the sulfiding process. Similarly, as the $H_2$ gas concentration decreases in the gas sample 402, the refinery operator can supply additional $H_2$ gas through $H_2$ makeup line 118.

Module 400 may also comprise a controller 528, such as a microprocessor, programmable gate array, PID controller or other programmable logic device 324. The controller also may be operatively coupled to a human input device, such as a keyboard or touchscreen, a visual display device, such as a liquid crystal display or other device capable of presenting visual information, memory, a power supply for powering the controller 322 components and the communications component 526. It will be appreciated that the controller 528 and communications component 526 may interact to allow control of the components associated with module 400.

Although this description of an embodiment of module 400 comprises a combined $H_2S$ and $H_2$ detection capability, it will be appreciated that module 400 can have $H_2S$ only detection capability, $H_2$ only detection capability or the combined ability as described. Also, separate $H_2S$ and $H_2$ modules can be used together as described above.

Having now described embodiments of our sulfur supply module 200 and our detection module 400, we turn now to a discussion of one of many possible embodiments of an in-situ sulfiding method using our inventions. In practice, a sulfur supply module 200 and a combined hydrogen sulfide and hydrogen gas detection module 400 may be delivered to a refinery location and positioned adjacent a hydroprocessing unit 100 having catalyst to be sulfided. The outlet 204 of the sulfur supply module 200 may be plumbed into a preferably existing injection port (not shown) in the hydroprocessing unit 100. As described with respect to FIG. 2, such injection port may be located at locations 204*a*, 204*b*, 204C or other suitable sulfur injection site or sites. A supply of sulfur product, such as, but not limited to liquid DMDS, will be provided, such as in the form of a tanker truck or trucks. A conventional suction hose resistant to the sulfur product can be plumbed between the tanker truck outlet and the inlet 202 to sulfiding module 200. Similarly, the detection module 400 may be placed adjacent a portion of the hydroprocessing unit 100 where access to the sulfiding gas return 126 is provided. A flexible conduit is preferably attached to a valved extraction port already existing in the hydroprocessing unit 100 and plumbed to the inlet port 402 on the module 400.

It is preferred, but not required, that that the connections and components of sulfiding module 200 be leak tested before the sulfur product is injected, such as by using diesel or other inexpensive, liquid hydrocarbon to test/purge all lines and connections. The diesel may be injected by module 200 into the hydroprocessing system 100 after set up of the sulfiding module 200 and prior to commencement of sulfur product injection into process 100. This leak testing with, for example, diesel reduces the risk of sulfur product leaks during sulfiding. Similarly, after sulfiding is completed, a post-sulfiding purge of the sulfiding module 200 and reactor vessel 108 may be performed in similar fashion.

Power in the form of AC energy supplied by the refinery or DC battery power supplied on the sulfiding module 200 and detection module 400, or power supplied by a portable generator may be supplied to both modules 200 and 400. Both modules may be powered up and the equipment initialized and checked. The communication link, whether wired or wireless, may be established. In a preferred embodiment, a laptop computer may be used to establish wireless communication among the sulfiding module 200, the detection module 400 and the laptop (not shown). The wireless link among these modules and the laptop computer allows the laptop computer and operator to see the operating condition of all components.

Figure 6:
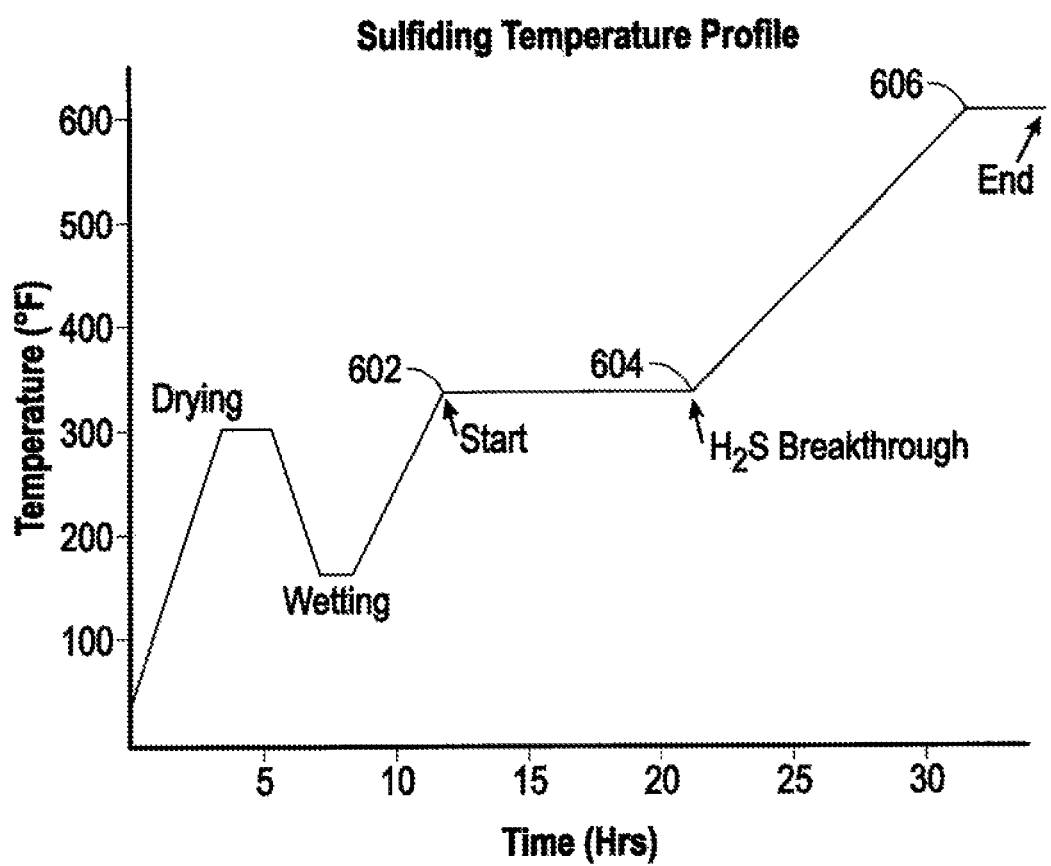
FIG. 6 illustrates a typical sulfiding temperature profile according to the present invention.

FIG. 6 illustrates a typical sulfiding temperature profile for sulfiding a metal catalyst with liquid DMDS. Once the hydroprocessing unit 100 is ready for the sulfiding process the catalyst in reactor vessel 108 may be dried in conventional fashion, such as by purging the reactor vessel 108 with hydrogen gas (typically supplied by the refinery), or other dry gas, or with liquid feedstock. As an example only, the reactor vessel 108 may be run up to a temperature of about 300° F. and pressure of about 200 psig to about 500 psig on hydrogen gas for a period to satisfactorily dry the metal catalyst therein. Thereafter, during the wetting step, the reactor temperature is reduced to between about 150° F. to about 250° F. and hydrocarbon feedstock is introduced to wet the catalyst.

After wetting, the reactor temperature is increased to the sulfur source's (e.g., DMDS) $H_2S$ decomposition temperature range, such as about 350° F. to 450° F. At this point in the temperature profile 602, and as shown in FIG. 6, the sulfiding module 200 may be energized and the controller 322 starts pump 104 to begin delivery of the sulfiding product, such as DMDS, into the hydroprocessing unit 100 at a first flow rate. During this first sulfiding phase or plateau, the temperature remains relatively constant at about 350° F. to 450° F. for an extended period, and the flow rate of sulfur product typically will gradually or step-wise increased. As is known, $H_2S$ removal from the recycle gas stream is discontinued, when possible, until sulfiding is completed. During this first phase of sulfiding, $H_2S$ concentration in the recycle gas will remain relatively low, such as about 30 ppm to about 160 ppm or even up to about 200 ppm. As is also known, hydrogen gas may need to be introduced into the hydroprocessing unit 100 to ensure a reasonably constant and appropriate hydrogen gas concentration in the reactor vessel 108.

This first sulfiding phase or plateau effectively ends at a point 604, which is often referred to as $H_2S$ breakthrough. Theoretically, $H_2S$ breakthrough occurs when the reactants reach thermodynamic equilibrium at given process mass flux. In reality, $H_2S$ breakthrough is recognized when $H_2S$ concentration in the recycle gas 402 rapidly increases. The present invention will detect and report this increase in $H_2S$ in essentially real time by detection module 400. $H_2S$ breakthrough typically is not a universally accepted $H_2S$ concentration value, and usually refinery operators have their own standard for when breakthrough is recognized. For example, and without limitation, breakthrough may be considered to occur when $H_2S$ concentrations reach about 3,000 ppm or higher, even up to about 5,000 ppm. In theory, approximately one-half of the stoichiometric amount of sulfur should have been injected before breakthrough is reached. In practice, the percentage can range from about 50% to about 65% of the stoichiometric amount. The fluid measurement device 318 in module 200 may be configured to substantially continuously report the total mass or volume flow of sulfiding agent that has been injected at any point in time and, therefore, the sulfiding module 200 can report when the stoichiometric breakthrough point (by mass) is approaching or has been reached.

Regardless of how or when breakthrough is determined, as shown in FIG. 6, once $H_2S$ breakthrough is determined, the reactor temperature is raised to about 600° F. to about 650° F. by use of heat exchanger 106 to increase the sulfiding of the catalyst. The rate of temperature increase typically will depend on the metallurgical constraints of the process 100, and is usually controlled by the process operator. At this point 606 in the temperature profile, the second sulfiding regime or plateau begins and the temperature remains relatively constant at about 600° F. to about 650° F. for a period until sulfiding is complete; e.g., until the pre-determined amount of sulfur product has been injected.

As will be discussed in more detail below, during this sulfiding process the flow rate of sulfur product (e.g., DMDS) supplied by module 200 can be controlled by an operator accessing the controller 322, through the communications link, such as via a laptop or Internet computer, and issuing commands to controller 322 and, therefore, pump 104. Alternately, controller 322 can automatically control the flow rate of sulfur product according to logic steps or programming residing in one or more memory modules accessible by controller 322.

Figure 7:
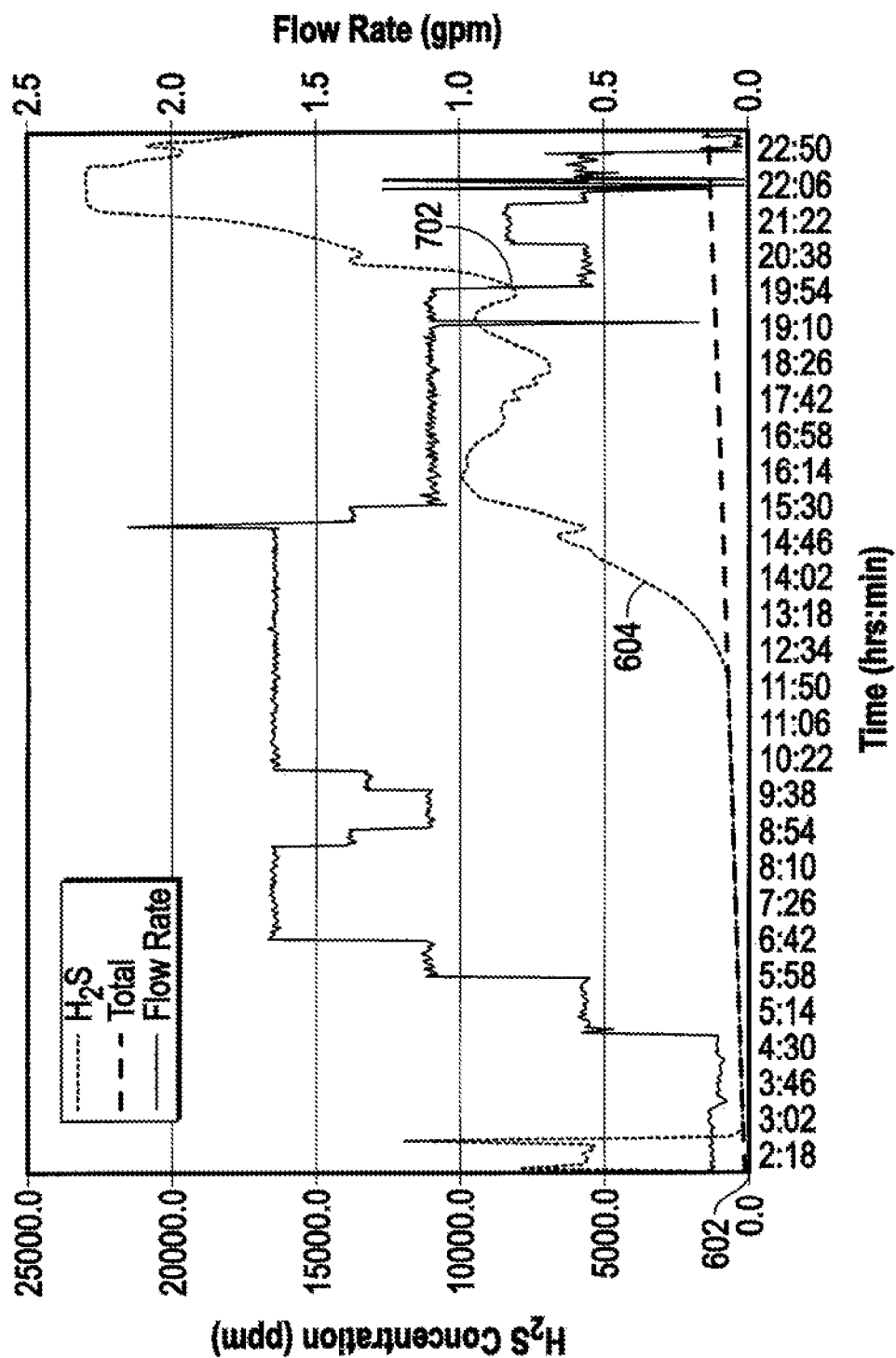
FIG. 7 illustrates hydrogen sulfide concentration as a function of time, and sulfur product flow rate as a function of time according to the present invention.

At the back end of the hydroprocessing unit 100, the detection module 400 continuously or substantially continuously monitors the hydrogen sulfide concentration and hydrogen gas concentration of the sulfiding gas (recycle gas) that is returned to the reactor 108. The data supplied by the module 400 may be used by the operator and/or controller 322 to increase the supply of sulfur product 202 to the sulfiding process or to decrease the amount of sulfur product to the sulfiding process. For example, if the total $H_2S$ content in the gas decreases below a predetermined value (such as, for example, 1,000 ppm) controller 322 can cause, either through operator input or by pre-programmed logic, the sulfiding module 200 to increase the supply of sulfur product to the catalyst residing in reactor 108. Alternately, as the amount of $H_2S$ in the recycle gas stream increases to, for example, 10,000 ppm or above, controller 322 can decrease the amount of sulfur product supplied to the system 100. For example, our sulfiding methods and systems can control the injection of sulfur product (i.e., control pump 104) by monitoring the $H_2S$ concentration in the recycle gas. During sulfiding, the modules 200 and 400 can interact and cooperate, alone or with external input, to maintain $H_2S$ concentrations between about 3,000 ppm and 23,000 ppm, as shown in FIG. 7, and most preferably between about 3,000 ppm and 10,000 ppm. By preferentially and proactively controlling the amount of $H_2S$ in the recycle gas, the amount of waste hydrogen sulfide that has to be flared or otherwise disposed of can be minimized. It will be appreciated that minimizing the flaring of hydrogen sulfide gas reduces, if not eliminates, a refinery's potential sulfur oxide emissions caused during sulfiding operations.

Referring again to FIG. 7, the graph shows hydrogen sulfide concentration in the sample gas from the recycle line versus process time, and sulfur product flow rate versus process time. FIG. 7 illustrates that on beginning of the sulfiding process at point 602, the flow rate of sulfur product is increased, preferably in stepwise fashion, to create a buildup of hydrogen sulfide gas during this first sulfiding stage. Once $H_2S$ breakthrough is recognized at, for example, point 604 because of an increase in $H_2S$ gas, the flow rate of sulfur product 202 may be adjusted, such as decreased or increased, to maintain an optimum concentration of $H_2S$ and avoid an overabundance of waste $H_2S$. The flow rate of the sulfur product may be adjusted by varying the speed of pump 108 or by adjusting controllable valve 320, or a combination of both actions.

FIG. 7 also illustrates what is commonly referred to a second $H_2S$ breakthrough 702 when using liquid DMDS as the sulfur source. When this second breakthrough is recognized, it typically marks complete sulfiding of the catalyst and sulfur product injection can be substantially decreased, including stopped. For example, and in contrast to what is illustrated in FIG. 7, if the inventions described herein are configured to limit $H_2S$ concentration to 10,000 ppm, when the second breakthrough is recognized, the inventions described would reduce the pump 108 speed dramatically to prevent the $H_2S$ concentration in the gas stream from exceeding 10,000 ppm. This type of control strategy based on $H_2S$ concentration will reduce the amount of sulfur product consumed and decrease the amount of waste $H_2S$ gas that must be sent to the flare line 124 or amine scrubber.

Figure 8:
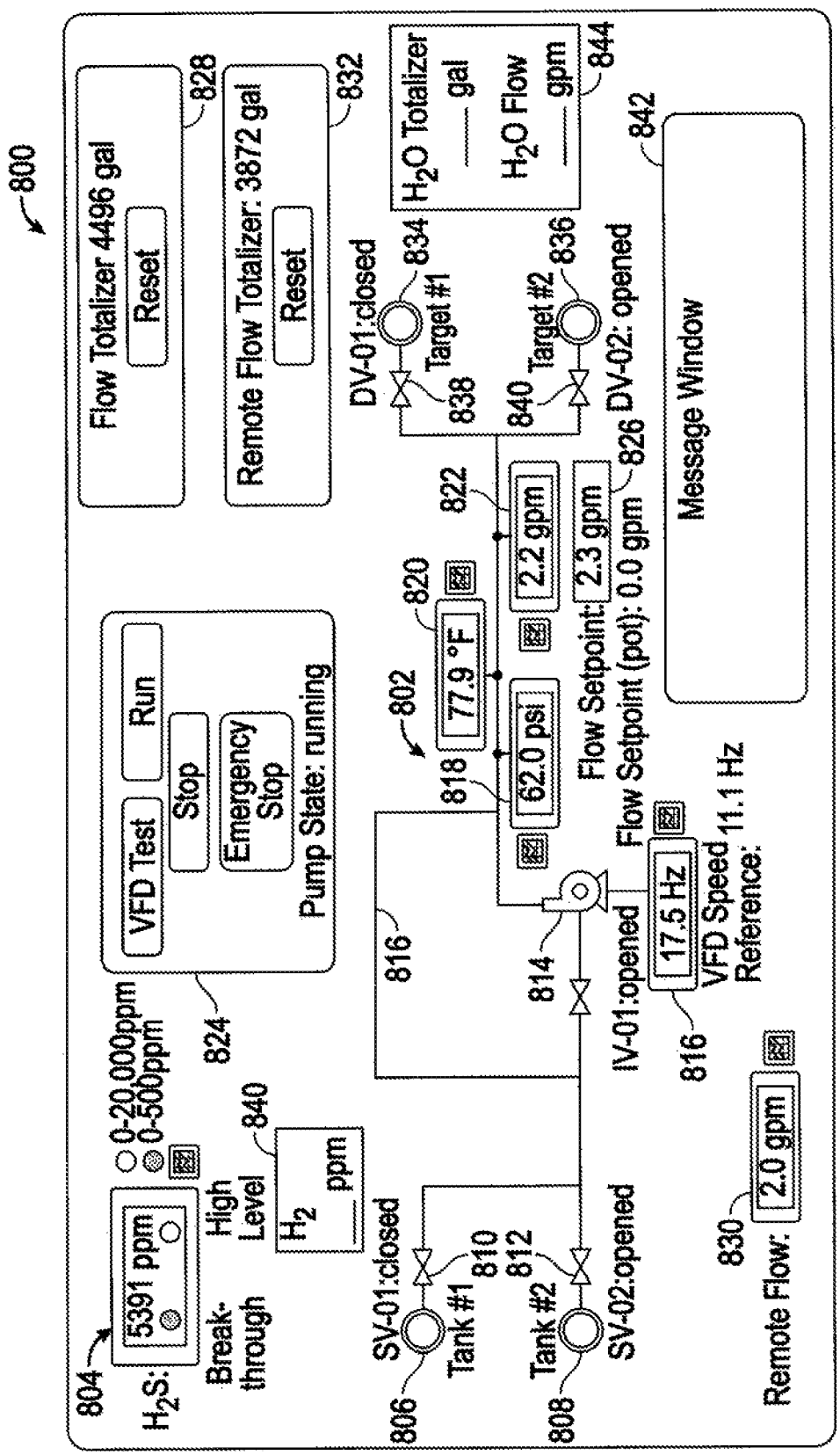
FIG. 8 illustrates one of many possible graphical user interfaces for use with the present inventions.

FIG. 8 illustrates one of many possible embodiments of a remotely displayed sulfiding system interface 800 for use with the present inventions. This interface 800 screen is the product of a properly configured and programmed sulfiding module 200 and detection module 400, and has a simplified piping diagram of a sulfiding module 802 similar but not identical to sulfiding module 200 discussed in FIGS. 2 and 3. A detection module, such as module 400 in FIG. 4, is represented by $H_2S$ display 804 and $H_2$ display 840. Display 804 can indicate the sensitivity or range that the hydrogen sulfide detection module is currently operating in and the interface can be used to change between the ranges. The display 804 also has indicators that can show when $H_2S$ breakthrough has been reached. As discussed above, because this point in the process is not precisely defined, the system allows the breakthrough $H_2S$ concentration to be programmed into the interface for each sulfiding process. Display 800 also has a high $H_2S$ level indicator that may be programmed to show when the sulfiding process is complete, such as when both the breakthrough and high level indicators are energized. The interface can be configured such that after the first breakthrough point is recognized, the rate of change $H_2S$ concentration is determined and an increasing rate of change may be used to indicate that the second breakthrough has been reached.

The sulfiding module 802 illustrated in FIG. 8 shows two sulfur product inlets 806 and 808, each with controllable valves 810 and 812. The interface preferably has the ability to indicate the state, such as opened or closed, of the inlet valves, 810 and 812, and register those states on the display. The inlets are shown to communicate with a pump 814 and a pump bypass loop 816. The pump 814 is preferably driven by an AC motor having a variable frequency drive (not shown). The status of the pump 814 is shown by readout 816, which can display revolutions per minute, frequency or pump flow volume. The flow measurement device 318 described in FIG. 3 is represented in interface 800 by readout 818 showing sulfur product pressure, readout 820 showing sulfur product temperature and readout 822 showing sulfur product flow rate. Additional readouts may be added depending on the functionality of the fluid measurement device actually used. For example, a sulfur product density readout and/or sulfur concentration readout may be utilized. Interface 800 also shows two sulfiding module outlets 834 and 836 and associate controllable valves 838 and 840. Although not shown, interface may also provide a "dry pipe" condition indicating that flow of sulfur product has been interrupted.

Interface 800 shows a pump status window that can report whether the pump is running or not and allow for emergency pump stop. A sulfur product volumetric flow rate setpoint window 826 is shown and the flow rate set point can be set by accessing the controller 322 on module 200. Also shown on interface 800 is a total volumetric flow rate window showing the total sulfur product injected into the hydroprocessing unit 100 at any particular time. Although not shown, interface 800 may present a H$_2$S breakthrough set point window in which the total volumetric flow is shown that correlates to 50% to about 65% of the stoichiometric sulfur needed to completely sulfide the catalyst, as discussed above.

Interface 800 also shows that more than one sulfiding module may be used to inject sulfur product into the hydroprocessing unit 100. Remote flow readout and remote flow totalizer window 832 provide information on second sulfiding module injecting sulfur product a second location in the unit.

FIG. 8 also shows that the interface may comprise a message window 842 that permits written or graphic communication among users of the interface. For example, the sulfiding contractor may use the messaging capability to inform the process 100 operators of a need for hydrogen makeup.

FIG. 8 also shows that the interface may comprise water flow rate and total water extracted. It is known that water is a byproduct of the sulfiding process and the process operators will routinely monitor and extract water from process 100 such as through outlet 122 shown in FIG. 4. The present inventions may also comprise a non-contact water detection device 426 (see FIG. 4) that can be coupled to outlet 122 to detect and report to interface 800 (and/or controller 322) the flow rate of water and the total of water extracted from the system during sulfiding. It will be appreciated that the amount of water generated by the sulfiding reaction is a direct measure of how the sulfiding reaction is progressing. As illustrated in FIG. 4, it is preferred that the water detection device 426 have the ability to wirelessly communicate with the interface 800 and/or the controller 322.

Once catalyst sulfiding has been completed, the present inventions can generate a sulfiding report, such as illustrated in FIG. 7, and which can further include parameters such as total mass and volume of sulfur injected, total water removed, and other data or parameters recorded, monitored or indicated during the sulfiding process.

In a preferred embodiment, the sulfiding module and the detection module can be monitored and controlled via a wireless data and communication link among the modules and a computer, such as a conventional laptop or desktop computer. The interface is preferably configured to allow monitoring and control of all aspects of the sulfiding module and the detection module. Alternately, the monitoring and control may be accomplished by a suitable configured website using conventional programming techniques to accomplish the functionality described herein. Still further, monitoring and control can be accomplished through a smart phone application.

Other and further embodiments utilizing one or more aspects of the inventions described above can be devised without departing from the spirit of Applicant's invention. For example, although the inventions were described primarily with liquid sulfur sources, the inventions can be used with gaseous sulfur products. Also, the interface described can allow for both manual, operator control of the equipment and automatic, preprogrammed operation. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A system for sulfiding a metal catalyst, comprising:
a fluid measurement device fluidly coupled between an inlet and an outlet, and configured to generate signals representative of one or more fluid properties of fluid flowing therethrough;
a controllable fluid pump fluidly coupled between the inlet and the outlet and configured to pump a sulfiding fluid into a reactor containing catalyst to be sulfided;
a hydrogen sulfide detector removably coupled to and configured to generate signals representative of hydrogen sulfide concentration in a gas recycle line; and
a controller configured to control the pump based at least in part on the hydrogen sulfide detector signals to minimize the amount of sulfiding fluid pumped into the reactor that is over a stoichiometric amount needed to sulfide the catalyst.

2. The system of claim 1, wherein the fluid measurement signals, and the hydrogen sulfide signals are communicated to a remote site in quasi-realtime.

3. The system of claim 2, the water detection device comprises a removable, non-contact sensor configured to transmit information between the water detection device and the remote site.

4. The system of claim 2, wherein the remote site comprises one or more of a portable computer, a website, and a smart phone.

5. The system of claim 2, wherein the controller and the hydrogen sulfide detector are configured to transmit information wirelessly to the remote site.

6. The system of claim 1, wherein the fluid measurement signals, and the hydrogen sulfide signals are communicated to a remote site in quasi-realtime, and the remote site communicates to the controller.

7. The system of claim 6, wherein the remote site comprises one or more of a portable computer, a website, and a smart phone.

8. The system of claim 1 further comprising a hydrogen gas detector configured to determine a hydrogen gas concentration in the gas recycle line.

9. The system of claim 1, wherein the controller is configured to control the pump to minimize the amount of sulfiding fluid pumped into the reactor based on mass flow of sulfiding fluid and a stoichiometric breakthrough.

10. The system of claim 1, wherein the pump comprises an AC motor and a variable frequency drive.

11. The system of claim 1, wherein the fluid measurement device comprises a multi-parameter fluid measurement device.

12. The system of claim 11, wherein the fluid measurement device is configured to determine volumetric flow rate, mass flow rate, fluid density, fluid pressure and fluid temperature.

13. The system of claim 12, wherein the fluid measurement device comprises a Coriolis meter.

14. The system of claim 1, wherein the controller and the hydrogen sulfide detector are configured to transmit information wirelessly.

15. The system of claim 14, wherein the hydrogen sulfide module is configured to transmit information to the controller for use in controlling the output of the system.

16. The system of claim 15, wherein the hydrogen sulfide module and the fluid measurement device are configured to transmit information to the controller for use in controlling the output of the system.

17. The system of claim 14, wherein the fluid measurement device and the hydrogen sulfide module are configured to transmit information to an Internet website.

18. The system of claim 17, wherein the fluid measurement device and the hydrogen sulfide module are configured to transmit information to an Internet website for use in controlling the output of the pressurization device.

19. The system of claim 17, wherein the fluid measurement device and the hydrogen sulfide module are configured to transmit information to the Internet website and the website is configured to transmit information to the controller for use in controlling the output of the system.

20. The system of claim 1, further comprising a water detection device configured to determine an amount of water generated while sulfiding the catalyst.

* * * * *